United States Patent
Cho et al.

(10) Patent No.: US 7,392,054 B2
(45) Date of Patent: Jun. 24, 2008

(54) RESOURCE ALLOCATION SCHEDULING METHOD FOR A CELLULAR COMMUNICATION SYSTEM

(75) Inventors: Sung-Hyun Cho, Seoul (KR); Robert W. Heath, Austin, TX (US); Sang-Boh Yun, Seongnam-si (KR); Won-Hyoung Park, Seoul (KR); Manish Airy, Austin, TX (US)

(73) Assignees: Samsung Electronics Co., Ltd. (KR); Board of Regents, The University of Texas System, Austin, TX (US)

( * ) Notice: Subject to any disclaimer, the term of this patent is extended or adjusted under 35 U.S.C. 154(b) by 167 days.

(21) Appl. No.: 11/141,496

(22) Filed: May 31, 2005

(65) Prior Publication Data

US 2005/0282550 A1    Dec. 22, 2005

Related U.S. Application Data

(60) Provisional application No. 60/575,960, filed on Jun. 1, 2004, provisional application No. 60/575,992, filed on May 31, 2004.

(30) Foreign Application Priority Data

Jan. 3, 2005    (KR) .................. 10-2005-0000110

(51) Int. Cl.
*H04Q 7/20* (2006.01)
(52) U.S. Cl. .................. 455/447; 455/450; 370/328
(58) Field of Classification Search ............. 455/447, 455/450, 114.2; 370/328, 281

See application file for complete search history.

(56) References Cited

U.S. PATENT DOCUMENTS

| | | | | |
|---|---|---|---|---|
| 6,687,503 | B1* | 2/2004 | Porter et al. | 455/452.1 |
| 6,904,286 | B1* | 6/2005 | Dantu | 455/452.2 |
| 6,928,263 | B2* | 8/2005 | Blake et al. | 455/41.2 |
| 6,961,323 | B1* | 11/2005 | Xu et al. | 370/329 |
| 2005/0036456 | A1* | 2/2005 | Laroia et al. | 370/328 |
| 2005/0041605 | A1* | 2/2005 | Benson | 370/280 |

FOREIGN PATENT DOCUMENTS

| | | |
|---|---|---|
| CN | 1251731 | 4/2000 |
| CN | 1316172 | 10/2001 |
| WO | WO 03/052964 | 6/2003 |
| WO | WO 2005/046283 | 5/2005 |

* cited by examiner

*Primary Examiner*—Nghi H. Ly
(74) *Attorney, Agent, or Firm*—The Farrell Law Firm, P.C.

(57) ABSTRACT

A resource allocation scheduling method for a cellular communication system that can avoid interference between cells. The method includes dividing a frequency band of a system into frames each having preferential allocation blocks and general allocation blocks on a time axis, classifying terminals in each cell into groups of terminals vulnerable to interference and terminals non-vulnerable to interference, and allocating resources by terminal groups according to priority orders given to the terminal groups. The preferential allocation resources designed to have the orthogonality to the interference cells, i.e., sectors, on the time axis are allocated to the terminals vulnerable to the interference, and the remaining resources are allocated to the terminals non-vulnerable to the interference.

14 Claims, 4 Drawing Sheets

RESOURCE ALLOCATION SCHEDULING METHOD FOR A CELLULAR COMMUNICATION SYSTEM

PRIORITY

This application claims priorities to provisional applications entitled "Resource Allocation Scheduling Method for Cellular Communication System" filed in the United States Patent and Trademark Office on May 31, 2004 and Jun. 1, 2004, and assigned Ser. Nos. 60/575,992 and 60/575,960, respectively, and an application entitled "Resource Allocation Scheduling Method for Cellular Communication System" filed in the Korean Industrial Property Office on Jan. 3, 2005 and assigned Serial No. 2005-110, the contents of which are hereby incorporated by reference.

BACKGROUND OF THE INVENTION

1. Field of the Invention

The present invention relates generally to a cellular communication system, and more particularly to a resource allocation scheduling method for a cellular communication system that can avoid interference between cells by preferentially allocating resources having orthogonality on a time axis to terminals having a high vulnerability of the interference between the cells.

2. Description of the Related Art

With the development of wireless communications, diverse services based on wideband communications, such as videoconferences and high-speed Internet access services, have been provided. Due to the advancement of the communications technologies, almost unlimited communication environments have been provided. However, a communication system based on a wireless access has a very low throughput, and is greatly affected by the mobility of a terminal. Also, system capacity in a cellular system is limited by interference between cells, and due to a carrier to interference (C/I) ratio between adjacent cells, the system capacity is remarkably reduced.

Generally, in the cellular system, each cell is divided into several sectors and resources are allocated by sectors, such that a signal to interference ratio can somewhat be reduced. However, in order to obtain high band efficiency for supporting a high-speed service, a technology that can minimize the interference between cells through a transmission scheduling and exquisite resource allocation in addition to the division of a cell into sectors is required.

SUMMARY OF THE INVENTION

Accordingly, the present invention has been designed to solve the above and other problems occurring in the prior art. An object of the present invention is to provide a resource allocation scheduling method for a cellular communication system that can obtain high band efficiency by increasing a frequency reuse rate through an exquisite frame design.

Another object of the present invention is to provide a resource allocation scheduling method for a cellular communication system that can achieve high band efficiency through a frame design of a wireless data cellular network, and also reduce complexity of a frequency design.

Still another object of the present invention is to provide a resource allocation scheduling method for a cellular communication system that can avoid interference between cells by allocating resources having orthogonality on a time axis to terminals vulnerable to the interference.

Yet still another object of the present invention is to provide a resource allocation scheduling method for a cellular communication system that can minimize the probability of interference by differently allocating transmission powers for different time periods on a time axis with respect to terminals that are not vulnerable to the interference in adjacent cells, i.e., sectors, that use the same frequency resources.

In order to accomplish the above and other objects, there is provided a resource allocation scheduling method for a cellular communication system in which a frequency reuse rate is at least '1'. The method includes the steps of dividing a frequency band of a system into frames each having preferential allocation blocks and general allocation blocks on a time axis, classifying terminals in each cell into groups of terminals vulnerable to interference and terminals non-vulnerable to interference, and allocating resources by terminal groups according to priority orders given to the terminal groups.

In accordance with another aspect of the present invention, there is provided a resource allocation scheduling method for a cellular communication system that provides a communication service through a system frequency band given to a plurality of base transceiver subsystems connected by a wire network and terminals located in cells that are wireless areas of the respective base transceiver subsystem. The method includes the steps of: dividing the respective cell into at least two sectors; dividing the frequency band into frames each having a specified period on a time axis; dividing the frame into subbands the number of which is equal to the number of sectors on a frequency axis; dividing the respective subbands into preferential allocation areas and standard allocation areas and arranging the preferential allocation areas and the standard allocation areas, such that the preferential allocation areas of the same subbands allocated to the sectors of the different cells do not overlap each other; classifying the terminals in the respective cell into groups of terminals vulnerable to interference and terminals non-vulnerable to interference; and allocating the preferential allocation areas to the terminals vulnerable to interference.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE PREFERRED EMBODIMENTS

Preferred embodiments of the present invention will be described in detail hereinafter with reference to the accompanying drawings. In the following description of the present invention, a detailed description of known functions and configurations incorporated herein will be omitted when it may obscure the subject matter of the present invention.

Figure 1:
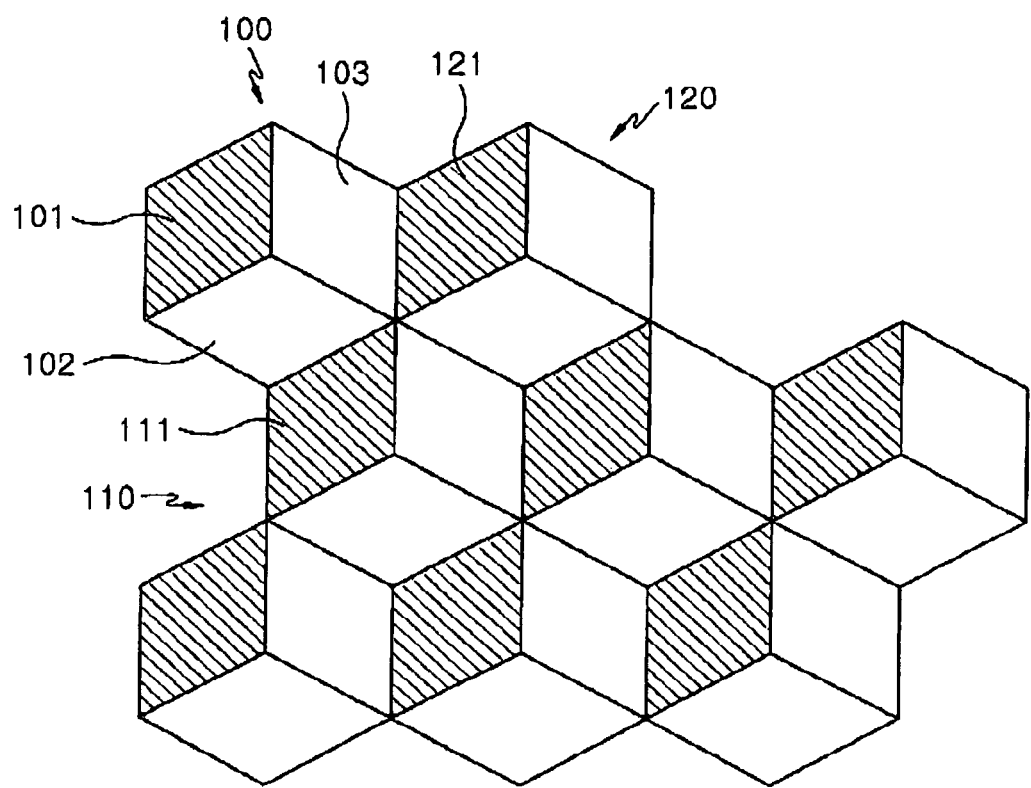
FIG. 1 is a conceptual view illustrating a cellular system including hexagonal cells to which the present invention is applied.

FIG. 1 illustrates a cellular system including hexagonal cells to which the present invention is applied. Referring to FIG. 1, each cell is divided into three sectors. All cells are allocated with the same frequency band, and sectors 101, 102, and 103 that constitute a cell 100 are allocated with different resources. Additionally, the respective sectors in the cell are designed to be allocated with resources different from those of the adjacent sectors of the adjacent cells. In the present invention, sectors that use the same frequency in different cells are called "interference sectors". In FIG. 1, the interference sectors of the sector 101 of the cell 100 are a sector 111 of an adjacent cell 110 and a sector 121 of another adjacent cell 120.

For high band efficiency and a low complexity of band design, an aggressive frequency reuse is required for developing wireless cellular systems. Because the adjacent cells, i.e., sectors,) can simultaneously transmit data, a signal to interference (C/I) margin is small, which is a disadvantage of the aggressive frequency reuse. The interference caused by the adjacent sectors can be minimized by coordinating the transmission from the sectors that cause the interference through an exquisite scheduling in the base transceiver subsystem (BTS).

In a multiple-input multiple-output (MIMO) system, the interference from the adjacent cells is not scalar, like a single antenna system. A soft scheduling tunes matrix interference from the adjacent sectors, and particularly, a sufficient C/I margin for transmission to the terminal in a cell boundary area can be obtained.

Figure 2:
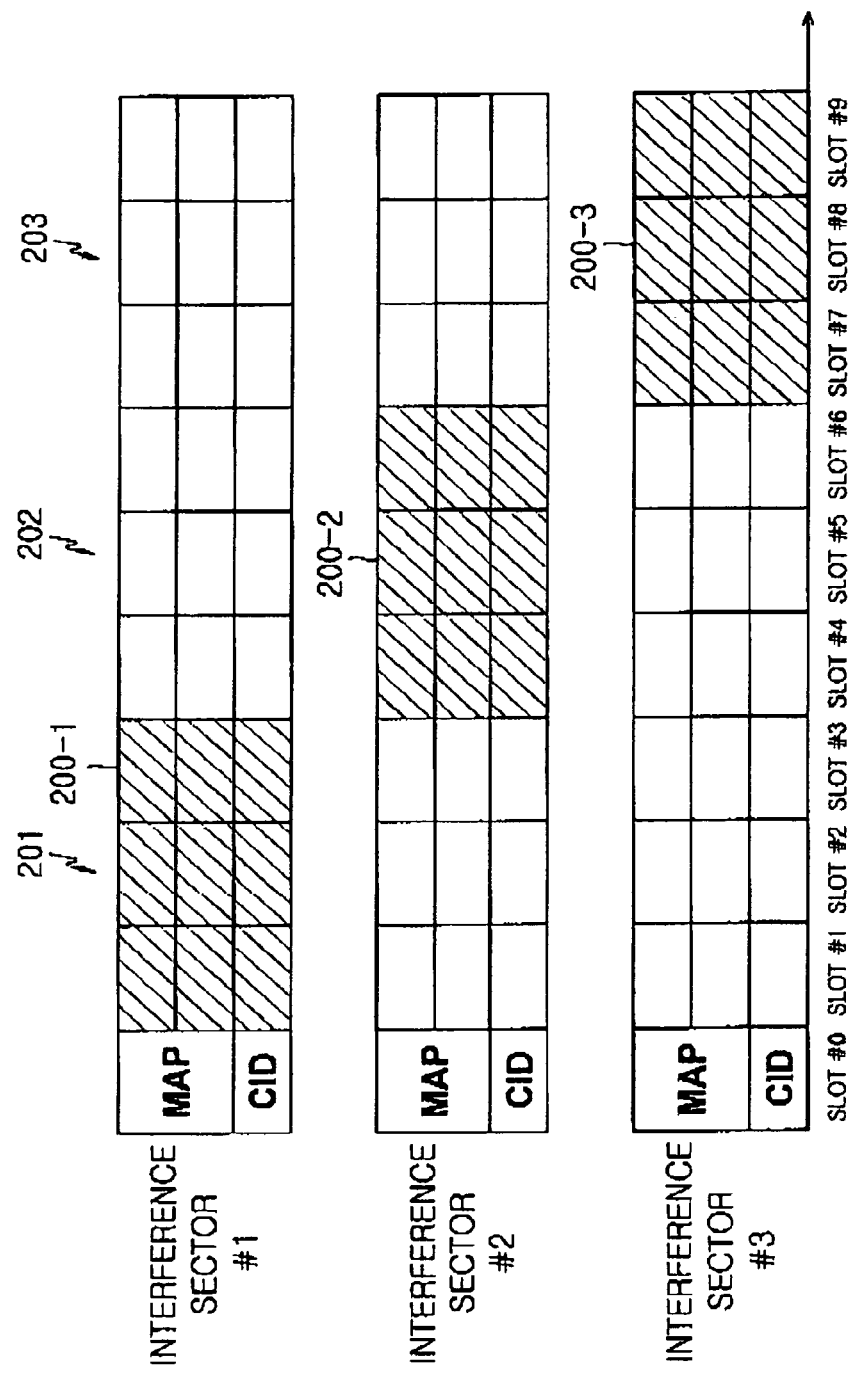
FIG. 2 is a conceptual view illustrating resource use types in a resource allocation scheduling method according to a preferred embodiment of the present invention.

FIG. 2 illustrates a resource allocation scheduling method in sectors that use the same frequency band in a cellular communication system according to a preferred embodiment of the present invention. In the embodiment of the present invention, although the frame is designed based on a time division multiplexing, the present invention is not limited thereto, but may be designed based on a multiple system such as a frequency division, space division, code division, etc.

Referring to FIG. 2, the frame is divided in time into 10 slots on a time axis. Herein, 10 slots are illustrated for convenience in explanation, but the number of divided slots may be varied.

A slot #0 of the system resources is allocated for a control signal such as a mobile application part (MAP), a cell identifier (CID), etc., and the remaining slot #1 to slot #9 are allocated for the data transmission. The data area of the respective subband is divided into blocks 201, 202, and 203 the number of which is equal to the number of sectors in one cell on the time axis. In this embodiment of the present invention, because a data region includes 9 slots and each cell is divided into three sectors, wherein the three blocks of the respective subband constitute one block. Accordingly, the respective subband has three blocks, each of which includes three slots for data, and one slot for the control signal, which is shared, by the three blocks.

The interference sectors 101, 111, and 121 that use the same frequency band sets one of the three blocks that constitute the respective subband as preferential allocation blocks 200-1, 200-2, and 200-3, and arranges the preferential allocation blocks 200-1, 200-2, and 200-3 of the interference sectors 101, 111, and 121, such that they do not overlap each other on the time axis.

In this embodiment of the present invention, for convenience of explanation, the preferential allocation blocks 200-1, 200-2, and 200-3 of the interference sectors 101, 111, and 121 that use the same frequency band are arranged in order on the time axis, but the order of arrangement can be changed.

Using the frame as described above, the terminals sensitive to the interference are allocated with slots that are included in the preferential allocation blocks. The terminals that are located in the different interference sectors and that are allocated with the slots in the preferential allocation blocks do not interfere with each other because the allocated slots have the orthogonality in time. Through this interference avoidance, efficient frequency reuse becomes possible.

In order to implement the scheduling method according to the present invention, a scheduling in consideration of detection and feedback of the interference of the terminals, confirmation of the terminal vulnerable to the interference, and interference vulnerability in the respective BTS is required.

The transmission scheduling is performed between the synchronized sectors, and a scheduler (not illustrated) of the respective interference sector first allocates the resources of the preferential allocation blocks and then randomly allocates the remaining resources. Through this scheduling, the probability of interference occurrence can be lowered. That is, if the traffic load is small, the interference from other main interference sectors is avoided, while if the traffic load is large, an average C/I ratio is improved.

According to the scheduling method of the present invention, the respective sector is divided into internal and external areas of a concentric circle around the BTS, and the transmission powers of the terminals in the internal area are controlled, such that an improved performance of the system can be expected.

Figure 3:
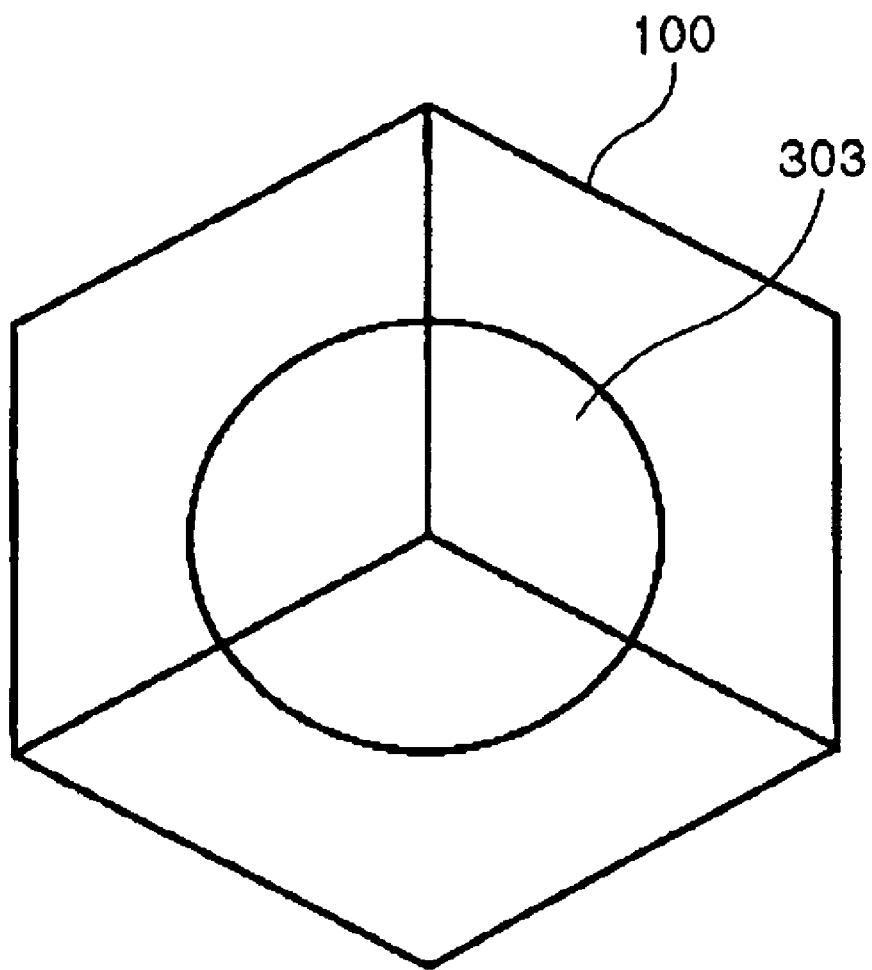
FIG. 3 illustrates an internal area of a cell to which a transmission power control is applied in a resource allocation scheduling method according to another embodiment of the present invention.

FIG. 3 illustrates an internal area of the cell to which the transmission power control is applied in the resource allocation scheduling method according to a preferred embodiment of the present invention. Referring to FIG. 3, in each sectored cell 100, a virtual internal area 303 is provided around the BTS.

Accordingly, in the internal area 303 of the respective sector, a high C/I margin can be secured even if the traffic load of the main interference sectors is heavy or the data is transmitted using the whole frame. This area is a cell area having the least sensitivity to the interference.

According to the location of the terminal and the channel state in the internal area 303 of the sector, a temporary attenuation caused by signals transmitted from the sector BTS and the interference sectors will greatly differ among the terminals when the signals reach the terminals.

Conversely, if all the BTSs continuously transmit the signals with the same power, the average C/I ratio of the terminals located close to the BTS will be far greater than that of the terminals located on the sector boundary. Assuming that the respective terminals continuously perform the channel measurement, the scheduler may classify the terminals on the basis of the interference vulnerability. Additionally, the terminals may support the power control of the BTS by measuring the change of the interference power received from the adjacent sectors.

The terminals that are more vulnerable to the interference are scheduled only in the preferential allocation blocks, and the terminals that are less vulnerable to the interference are scheduled in the general data blocks if the resources of the preferential allocation blocks are drained.

Further, the C/I ratio must be balanced in all sectors. In the present system, the C/I ratio is increased in the internal area of the cell, but the C/I ratio in the cell boundary area limits the performance of the system and thus the peak C/I ratio is lowered.

Additionally, the interference vulnerability of the terminal can be ranked by the interference sectors. Through this ranking, the time orthogonality between pairs of interference sectors in the frame can be confirmed.

Figure 4:
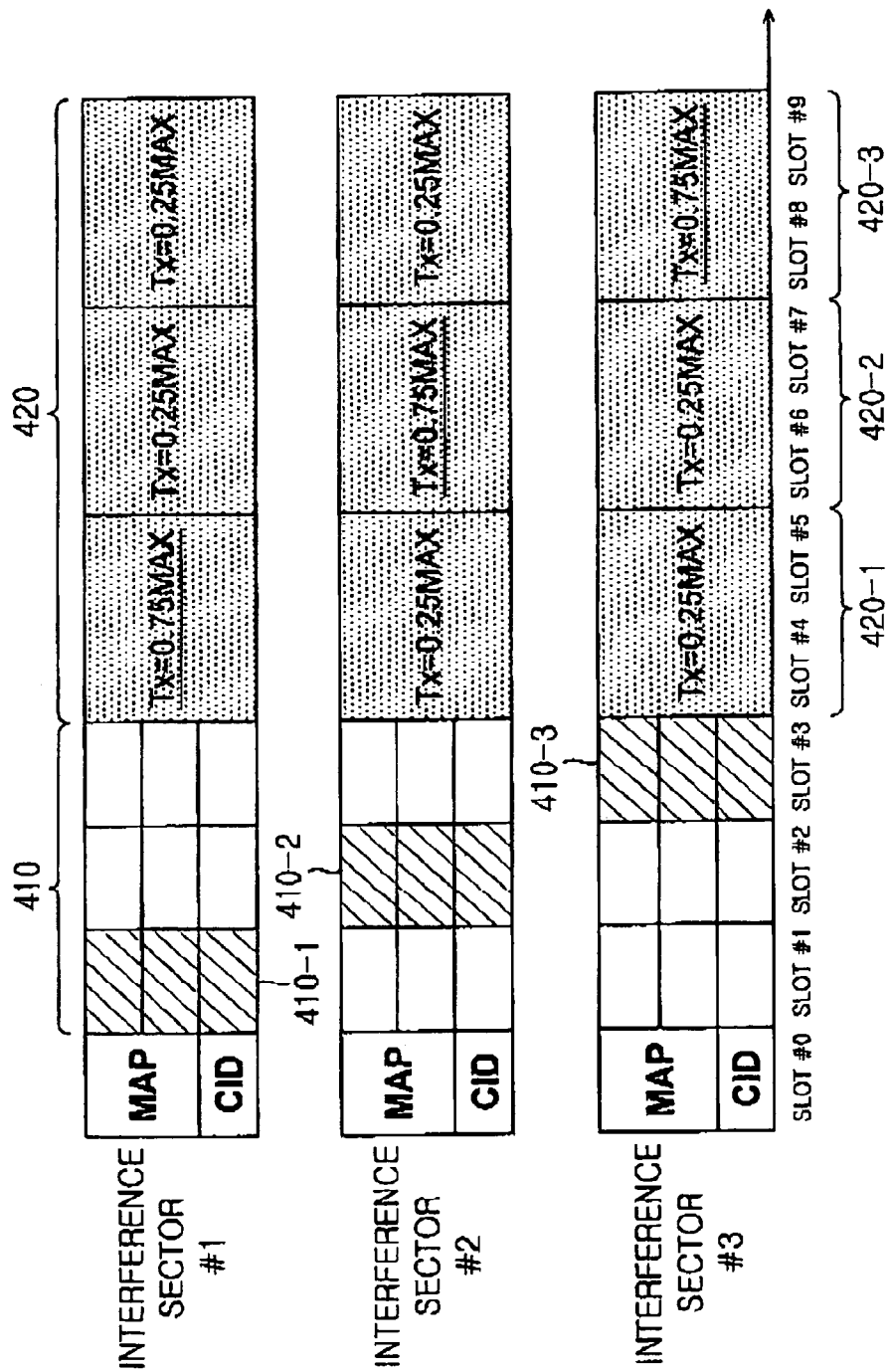
FIG. 4 illustrates resource use types in a resource allocation scheduling method according to another embodiment of the present invention.

FIG. 4 illustrates transmission power control in the resource allocation scheduling method according to another embodiment of the present invention. Referring to FIG. 4, the frame is divided into an orthogonal allocation area 410 and a power control area 420. With respect to the terminals having a high interference vulnerability, the respective interference sectors preferentially allocate preferential allocation blocks or slots 410-1, 410-2, and 410-3 of the orthogonal allocation area 410, while with respect to the terminals having a low interference vulnerability, the interference sectors allocate the power control area 420 with different transmission powers by cells or sectors for the same time period. Therefore, the interference between the sectors that use the same frequency can be minimized.

More specifically, with respect to slot #4 421 and slot #5 422 of the power control area 420, the interference sectors 101, 111, and 121 of FIG. 1 allocate different maximum transmission powers of 0.75, 0.25, and 0.25, with respect to slot #6 and slot #7, the maximum transmission powers of 0.25, 0.75 and 0.25, and with respect to slot #8 and slot #9, the maximum transmission powers of 0.25, 0.25 and 0.75, respectively, such that the interference between the sectors can be mitigated.

In the present invention, with respect to the three successive time blocks 420-1, 420-2, and 420-3 of the power control area 420, the interference sector #1 101 allocates the maximum transmission powers of 0.75, 0.25, and 0.25, the interference sector #2 111 allocates the maximum transmission powers of 0.25, 0.75, and 0.25, and the interference sector #3 121 allocates the maximum transmission powers of 0.25, 0.25, and 0.75, respectively.

However, the order and the level of the transmission power allocation to the time blocks are not limited thereto, but may be changed according to the change of the system environments. Additionally, in the embodiment of the present invention, it is assumed that the number of slots in the respective time block is two. However, the number of slots is not limited thereto, but may be changed according to the system.

Scheduling in a MIMO Cellular System

Hereinafter, the scheduling method according to the present invention that is generalized by applying the method to the MIMO cellular system will be explained.

With respect to a given reuse pattern, it is assumed that I is a set of BTSs that use the same frequency, and J is a set of terminals in the system. Because the respective terminal (j∈ J) is associated with its main BTS (i∈ I), the average C/I ratio of the link between i and j is largest among all the BTSs. Assuming that the multiple access is divided in time and all the BTSs are synchronized with one another, the slot period is $\tau_{slot}$ seconds, and N slots constitute one frame. The scheduler calculates the resource allocation of the respective sector for each frame period or $\tau_{slot}$ period.

The BTSs communicate with each other through a wire network, and receive a feedback of the control signal from the respective terminal. Each BTS includes a scheduler.

Basically, the terminal has an interference detection means, and through this interference detection function, measures interference parameters (such as C/I ratio, SINR, interference covariance, channel of the respective BTS, etc.) and determines the vulnerability of the interference. The terminal quantizes and feeds back measured information to the present BTS. The BTS determines if the terminals belong to the group vulnerable to interference, divides the terminals into two groups according to the terminals' sensitivities to interference, and then performs the scheduling. Time/frequency/space/code slots having a better interference characteristic in average are allocated to the terminals that are sensitive to the interference.

These resources may directly be allocated without coordination to other BTSs, or may be allocated with coordination to other BTSs using a backhaul network that connects the BTSs. In order to transmit the interference information from the terminal to the BTS, a reverse logic channel is used, and in order to transmit operation results of the scheduler to all the terminals, a forward logic channel is used.

Interference Vulnerability

The time-space MIMO channel between a pair of a BTS and a terminal is inherent, and the interference vulnerabilities of the respective terminal to all the interference BTSs are calculated and ranked. This ranking refers to a time-space variance function of the interference BTSs in relation to the terminals, and is changed as the channel condition between the respective terminal and interference BTS changes.

Power Control

The BTS transmits a signal to the respective terminal located in a sector with one of predetermined power levels. If the transmission power level is high, the average interference from the neighboring sectors becomes greater. If a multi-cell coordination through a wire network is possible or the scheduling is integrated onto a radio network controller (RNC), the BTS scheduler can optimize the transmission covariance for the multiple BTSs as well as the transmission power control.

Slot Allocation

The interference avoidance is possible through the orthogonal time slot allocation to the neighboring sectors. If the same slot is allocated, the interference occurs in proportion to the interference vulnerability of the terminal to the interference BTSs and the transmission power that the neighboring BTS uses for the transmission.

As described above, according to the scheduling method of the present invention, a blind coordination between the neighboring sectors becomes possible. It can be expected that the respective terminal measures the C/I ratio for the main BTS and all the interference sectors. By reducing the BTS transmission power level for a part of the slots, the terminals vulnerable to the interference can obtain an improved C/I ratio. The BTS transmission power level for the slot period offsets the interference vulnerability of the terminals that have been allocated with corresponding slot. The slots of the respective frame may be allocated to the three sectors in variance, and in this case, no overlapping transmission occurs.

The scheduling method according to the present invention can greatly improve the system capacity in combination with a capacity maximization scheme such as a precoding for the MIMO system.

In the present invention, a logical control channel for transmitting information about the operation results of the scheduler to the terminal or transmitting the quantized information from the terminal to the BTS is used.

As described above, the resource allocation scheduling method according to the present invention can avoid the interference between the cells that use the same resources by classifying the terminals according to the interference vulnerability, preferentially allocating the preferential allocation resources designed to have the orthogonality to the interference cells, i.e., sectors, on the time axis to the terminals vulnerable to the interference, and allocating the remaining resources to the terminals non-vulnerable to the interference.

Additionally, the resource allocation scheduling method according to the present invention can reduce the probability of interference occurrence with respect to the terminals non-vulnerable to the interference by controlling the transmission powers with respect to the terminals non-vulnerable to the interference in consideration of the transmission powers of the adjacent cells, i.e., sectors, that use the same frequency band.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. A resource allocation scheduling method for a cellular communication system in which a frequency reuse rate is at least '1', the method comprising the steps of:

dividing a frequency band of a system into frames, each of the frames having preferential allocation blocks and general allocation blocks on a time axis;

classifying terminals into groups of terminals vulnerable to interference and terminals non-vulnerable to interference; and allocating resources to the terminal groups according to priority orders given to the terminal groups, wherein the step of allocating resources further includes determining if the terminals vulnerable to interference exist;

allocating the resources of the preferential allocation blocks to the terminals vulnerable to interference, if the terminals vulnerable to interference exist;

determining if the resources of the preferential allocation blocks remain;

allocating the remaining resources of the preferential allocation blocks to the terminals non-vulnerable to interference, if the resources of the preferential allocation blocks remain; and allocating the resources of the general allocation blocks to the terminals non-vulnerable to interference, if the resources of the preferential allocation blocks do not remain.

2. The resource allocation scheduling method as claimed in claim 1, wherein the resources of the preferential allocation blocks are allocated to adjacent cells such that the resources have orthogonality on the time axis.

3. The resource allocation scheduling method as claimed in claim 2, wherein the resources of the general allocation blocks are allocated to the adjacent cells with different transmission powers on the time axis.

4. A resource allocation scheduling method for a cellular communication system that provides a communication service through a system frequency band given to a plurality of base transceiver subsystems connected by a wire network and terminals located in cells that are wireless areas of the respective base transceiver subsystem, the method comprising the steps of:

dividing a respective cell into at least two sectors;

dividing the frequency band into frames, each of the frames having a specified period on a time axis;

dividing each of the frames into subbands, a number of which is equal to a number of sectors on a frequency axis;

dividing the subbands into preferential allocation areas and standard allocation areas;

arranging the preferential allocation areas and the standard allocation areas such that the preferential allocation areas of the same subbands allocated to the sectors of the different cells do not overlap each other;

classifying terminals in the respective cell into groups of terminals vulnerable to interference and terminals non-vulnerable to interference; and allocating the preferential allocation areas to the terminals vulnerable to interference.

5. The resource allocation scheduling method as claimed in claim 4, wherein the preferential allocation areas are allocated to the terminals vulnerable to interference, and then the standard allocation areas are allocated to the terminals non-vulnerable to interference.

6. The resource allocation scheduling method as claimed in claim 4, wherein the subband is divided into a plurality of subchannels on the frequency axis.

7. The resource allocation scheduling method as claimed in claim 4, wherein the frame is divided into a plurality of slots on the time axis.

8. The resource allocation scheduling method as claimed in claim 7, wherein a first slot of the frame includes a control signal.

9. The resource allocation scheduling method as claimed in claim 8, wherein the control signal includes mobile application part (MAP) information.

10. The resource allocation scheduling method as claimed in claim 4, wherein the terminals vulnerable to interference and the terminals non-vulnerable to interference are classified according to vulnerability of interference from adjacent sectors that use a same subband.

11. The resource allocation scheduling method as claimed in claim 10, wherein a transmission power of the terminal is controlled according to the interference vulnerability.

12. The resource allocation scheduling method as claimed in claim 11, wherein if the interference vulnerability is increased, the transmission power of the terminal is increased, and if the interference vulnerability is decreased, the transmission power of the terminal is decreased.

13. The resource allocation scheduling method as claimed in claim 11, wherein the interference vulnerability is calculated using channel status information of the adjacent sectors measured by the terminal and fed back to the base transceiver subsystem.

14. The resource allocation scheduling method as claimed in claim 13, wherein the channel status information includes a variation amount of strength of interference signals received from the adjacent sectors.

* * * * *